(12) United States Patent
Jedlinski et al.

(10) Patent No.: US 12,121,836 B2
(45) Date of Patent: Oct. 22, 2024

(54) FILTER BOWL RETENTION MECHANISM

(71) Applicant: Collins Engine Nozzles, Inc., West Des Moines, IA (US)

(72) Inventors: Marek Jedlinski, Wroclaw (PL); Lukasz Pabirowski, Wroclaw (PL)

(73) Assignee: COLLINS ENGINE NOZZLES, INC., West Des Moines, IA (US)

( * ) Notice: Subject to any disclaimer, the term of this patent is extended or adjusted under 35 U.S.C. 154(b) by 143 days.

(21) Appl. No.: 17/745,161

(22) Filed: May 16, 2022

(65) Prior Publication Data

US 2022/0401860 A1 Dec. 22, 2022

(30) Foreign Application Priority Data

Jun. 18, 2021 (EP) ..................... 21461554

(51) Int. Cl.
*B01D 35/30* (2006.01)
*B01D 27/08* (2006.01)
*F01M 11/03* (2006.01)
*F02M 37/42* (2019.01)

(52) U.S. Cl.
CPC .......... *B01D 35/306* (2013.01); *B01D 27/08* (2013.01); *F01M 11/03* (2013.01); *B01D 2201/4076* (2013.01); *B01D 2201/4092* (2013.01); *F01M 2011/031* (2013.01); *F02M 37/42* (2019.01)

(58) Field of Classification Search
CPC .......... B01D 35/306; B01D 2201/4076; B01D 2201/4092; B01D 27/08; F01M 2011/031; F01M 11/03; F02M 37/42
See application file for complete search history.

(56) References Cited

U.S. PATENT DOCUMENTS

| 2,815,237 | A | * | 12/1957 | Jones | ..................... B01D 27/08 74/528 |
| 5,080,414 | A | * | 1/1992 | Hellquist | ................. A62B 9/04 294/31.1 |
| 5,259,953 | A | * | 11/1993 | Baracchi | ................ B01D 35/30 210/DIG. 17 |
| 10,428,704 | B2 | | 10/2019 | Schlaff et al. | |

(Continued)

OTHER PUBLICATIONS

European Search Report for Application No. 21461554.4, mailed Nov. 19, 2021, 5 pages.

*Primary Examiner* — John Kim
(74) *Attorney, Agent, or Firm* — CANTOR COLBURN LLP

(57) ABSTRACT

A retention mechanism for releasably securing a receptacle to another component includes a ratchet lever pivotally mounted about a screw, a torsion spring having a first end attached to a first end of the lever and being biased to pivot the lever about the screw axis to a first, locked position. A second end of the lever engages, in use, with teeth provided on the receptacle to secure the receptacle against rotation relative to the other component. The mechanism has a compression spring arranged to bias the lever in an axial position such that, in the first, locked position, the second end of the lever engages the teeth. The first end of the lever is configured to receive pressure from a user against the force of the torsion spring to pivot the lever about the axis such that the second end of the lever disengages from the teeth.

10 Claims, 9 Drawing Sheets

(56) References Cited

U.S. PATENT DOCUMENTS

| | | | |
|---|---|---|---|
| 2007/0175470 A1* | 8/2007 | Brookman | A62B 25/00 |
| | | | 128/200.14 |
| 2007/0187316 A1* | 8/2007 | Weinberger | B01D 35/147 |
| | | | 210/232 |
| 2016/0265609 A1* | 9/2016 | Corsetti | F16D 41/12 |
| 2018/0031241 A1* | 2/2018 | Johnson | B33Y 80/00 |
| 2018/0313241 A1* | 11/2018 | Schlaff | F01M 11/03 |

* cited by examiner

FILTER BOWL RETENTION MECHANISM

CROSS REFERENCE TO RELATED APPLICATIONS

This application claims priority to European Patent Application No. 21461554.4 filed Jun. 18, 2021, the entire contents of which is incorporated herein by reference.

TECHNICAL FIELD

The present disclosure relates to filter assemblies having a filter bowl or cartridge, containing a filter medium, attached to a manifold, such as, but not only, for use as a lubricant/oil or fuel filter in machines and vehicle engines.

BACKGROUND

Filters are provided in various applications to filter fluid flowing along a fluid flow path in order, for example, to remove particles or contaminants from the fluid. The present disclosure is concerned with the type of filter having a fluid inlet and a fluid outlet and a filter path between the inlet and the outlet, wherein the filter path passes through a filter medium arranged to remove the material to be filtered from the fluid before it arrives at the outlet. Such filters find use in e.g. vehicle fuel systems, where fuel is drawn from a reservoir by a pump and delivered to the engine. Filters are provided in the flow path to remove any particulate matter or debris and to ensure that the fuel reaching the engine is as clean as possible to avoid damage to the engine and permit optimal engine performance. Such filter assemblies may comprise a manifold with an inlet and outlet for connection to the fuel lines and a filter material. This may be provided in a filter cartridge or bowl removably attached to the manifold. Filters are also used to filter lubricant fluid e.g. oil. In vehicles, and particularly in aircraft, the effectiveness and reliability of the filters is important for performance, efficiency and safety.

Over time, the filter material may become clogged presenting an impedance to the flow of fluid through the filter. When the filter medium becomes clogged or has exceeded its useful or permitted life, it needs to be removed and replaced. The filter bowl is therefore usually attached to the manifold by means of a threaded connection. An adapter is provided between the filter bowl and the manifold and the bowl is threadedly attached to one side of the adaptor, the other side of which is attached to the manifold. To remove the bowl, the user will rotate the bowl relative to the adaptor/manifold. To attach the bowl to the manifold, the user engages the threads and rotates in the opposite direction.

Filters of this sort are often used in environments that are subject to high vibrations and impact which might undesirably loosen the threaded engagement. Further, the filters may be located in areas which are difficult to access, and it may be difficult to ensure the required torque to provide secure fastening of the bowl to the adaptor/manifold. In such circumstances, the bowl may become disengaged undesirably. Additional fastening or securing mechanisms may be provided as a safety feature, such as shown in U.S. Ser. No. 10/428,704. A problem is that it may be difficult for the user to release the fasteners while holding the bowl to prevent the bowl dropping as the fasteners are released. The fasteners generally have to be operated using two hands and handling is difficult, especially where access is difficult.

There is, therefore, a need for a retention mechanism that reliably secures a filter bowl to a manifold even in vibrational or difficult to access environments but which is simple to release and can be operated with one hand.

SUMMARY

According to the disclosure, there is provided a retention mechanism for releasably securing a filter assembly receptacle such as a filter bowl to another filter assembly component such as a manifold or manifold adaptor, the retention mechanism comprising a ratchet lever pivotally mounted about a screw, a torsion spring having a first end attached to a first end of the lever and being biased to pivot the lever about the screw axis to a first, locked position, and wherein a second end of the lever engages, in use, with teeth provided on the receptacle to secure the receptacle against rotation relative to the other component; the mechanism further comprising a compression spring arranged to bias the lever in an axial position such that, in the first, locked position, the second end of the lever engages the teeth; and wherein the first end of the lever is configured to receive pressure from a user against the force of the torsion spring to pivot the lever about the axis such that the second end of the lever disengages from the teeth and the receptacle is able to rotate relative to the other component.

The lever may comprise two arms extending on either side of a middle part, the first arm defining the first end and the second arm defining the second end, the middle part defining a bore through which the screw passes.

In an example, a protrusion extends inwardly from the middle part into the bore and a spring retainer is arranged between the torsion spring and the screw and has a groove, whereby, in the first, locked position, the protrusion is out of alignment with the groove such that the lever remains in abutment with the spring retainer and the compression spring is compressed. When the lever receives pressure by the user, the protrusion rotates into alignment and engagement with the groove to secure the lever in an unlocked position.

Also provided is a receptacle assembly such as a filter assembly, comprising a receptacle e.g. a filter bowl, and another component, e.g. a manifold or manifold adaptor to which the receptacle is to be releasably attached, and a retention mechanism as defined above.

BRIEF DESCRIPTION OF THE DRAWINGS

Examples of the mechanism according to the disclosure will now be described by way of example only with reference to the drawings.

FIG. 2A shows a retaining mechanism according to the disclosure mounted to a filter assembly, from a front view.

FIG. 2B shows the assembly and mechanism of FIG. 2A from a side view.

FIG. 2C shows the assembly of FIGS. 2A and 2B from a bottom view.

FIG. 2D shows the assembly of FIGS. 2A, 2B and 2C in perspective view.

FIG. 2E is a sectional view through the assembly of FIGS. 2A to 2D.

FIG. 3A shows a retaining mechanism according to the disclosure mounted to a filter assembly, from a front view.

FIG. 3B shows the assembly and mechanism of FIG. 3A from a side view.

FIG. 3C shows the assembly of FIGS. 3A and 3B from a bottom view.

FIG. 3D shows the assembly of FIGS. 3A, 3B and 3C in perspective view.

FIG. 3E is a perspective view of an assembly such as shown in FIGS. 3A to 3D, showing the mistake-proof function.

FIG. 3F is a detailed view of the retainer mechanism of FIG. 3E.

FIG. 4A is a perspective view; FIG. 4B is a top view; FIG. 4C is the view of FIG. 4A but with parts removed to aid in description; FIG. 4D is a view of the lever.

DETAILED DESCRIPTION

Figure 1:
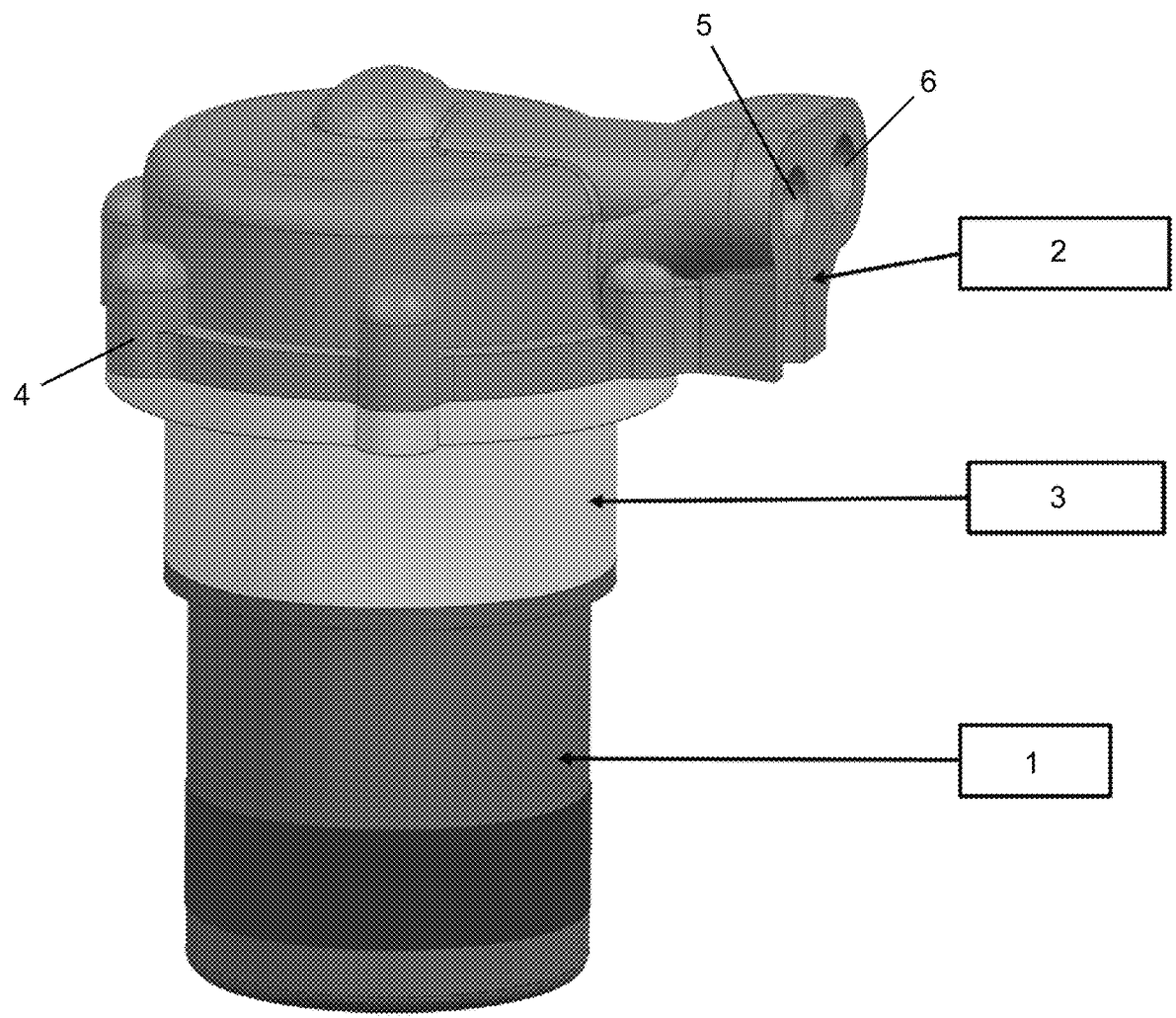
FIG. 1 is a perspective view of a filter assembly in which the mechanism of this disclosure can be incorporated.
Figure 2A:
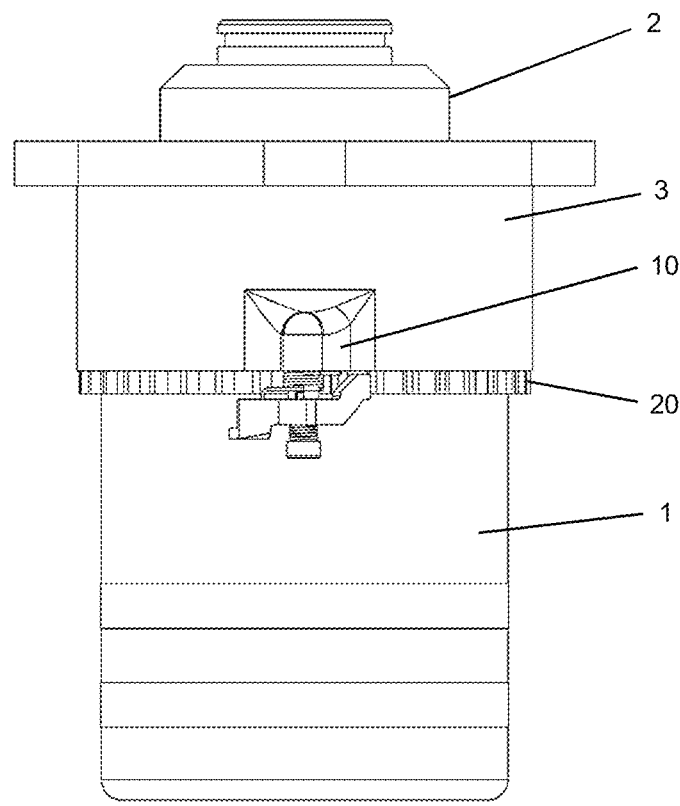
FIGS. 2A-2E show a mechanism of the disclosure in the engaged position.
Figure 2B:
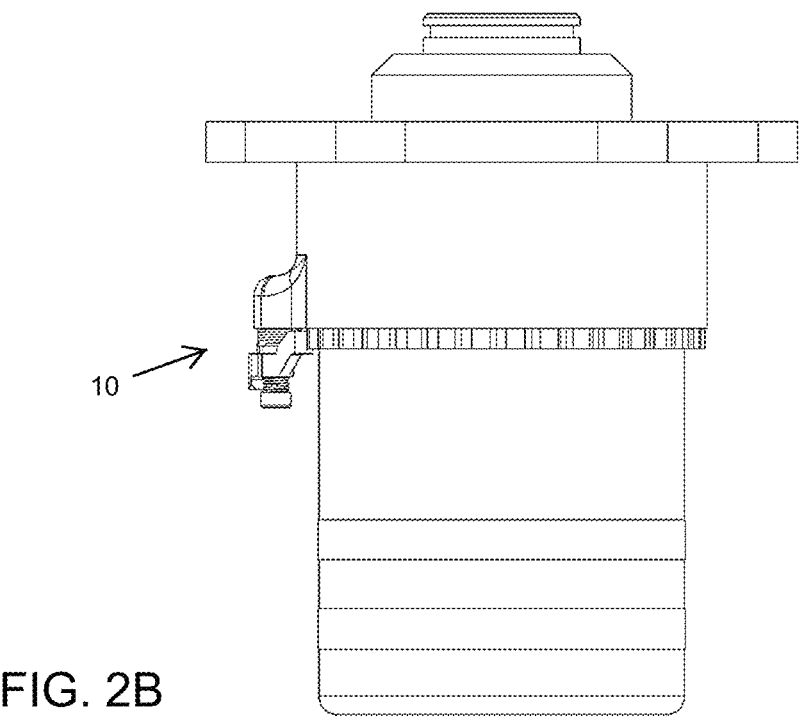
Figure 2C:
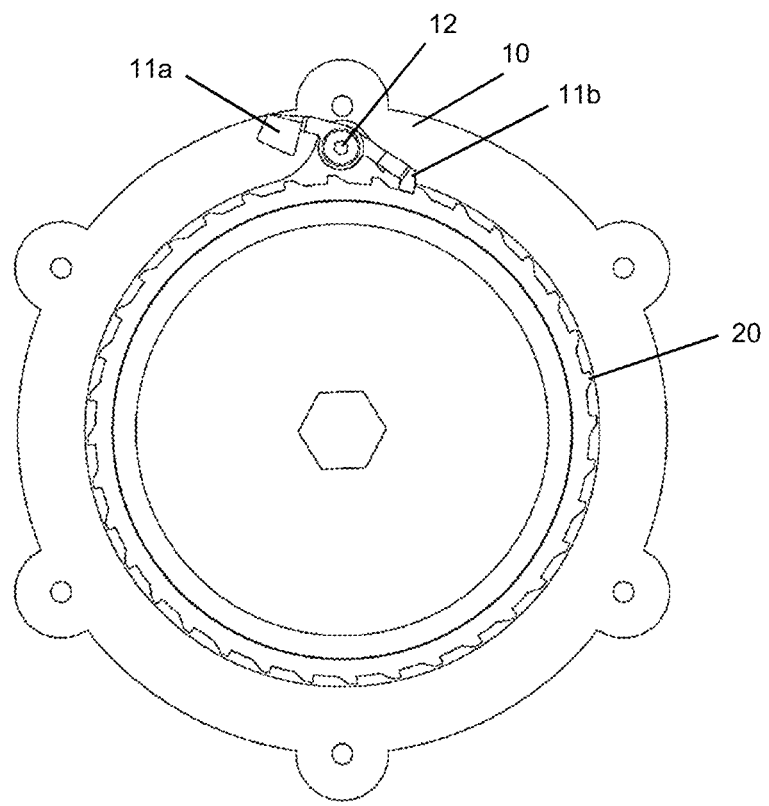
Figure 2D:
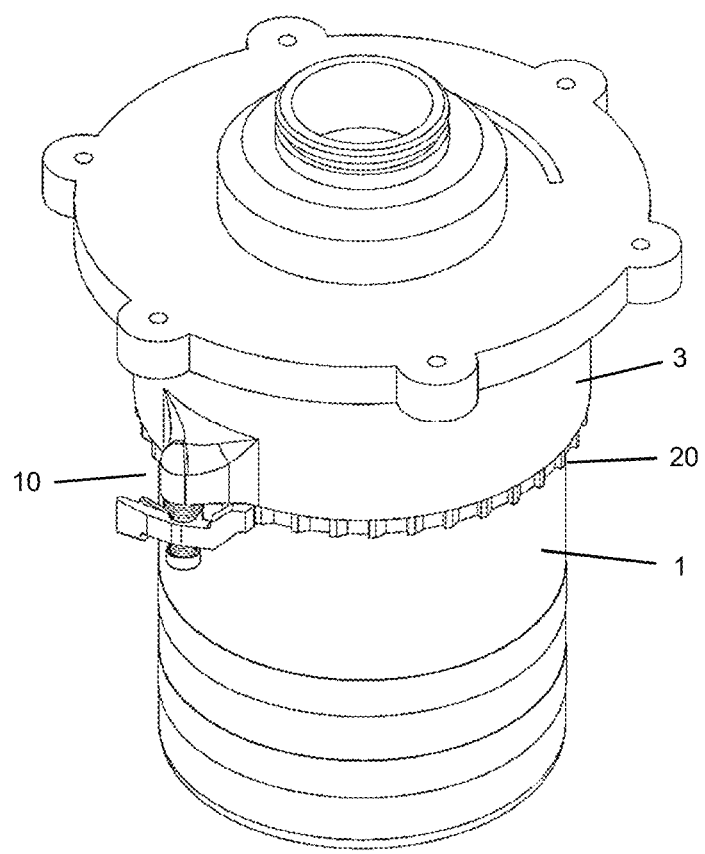
Figure 2E:
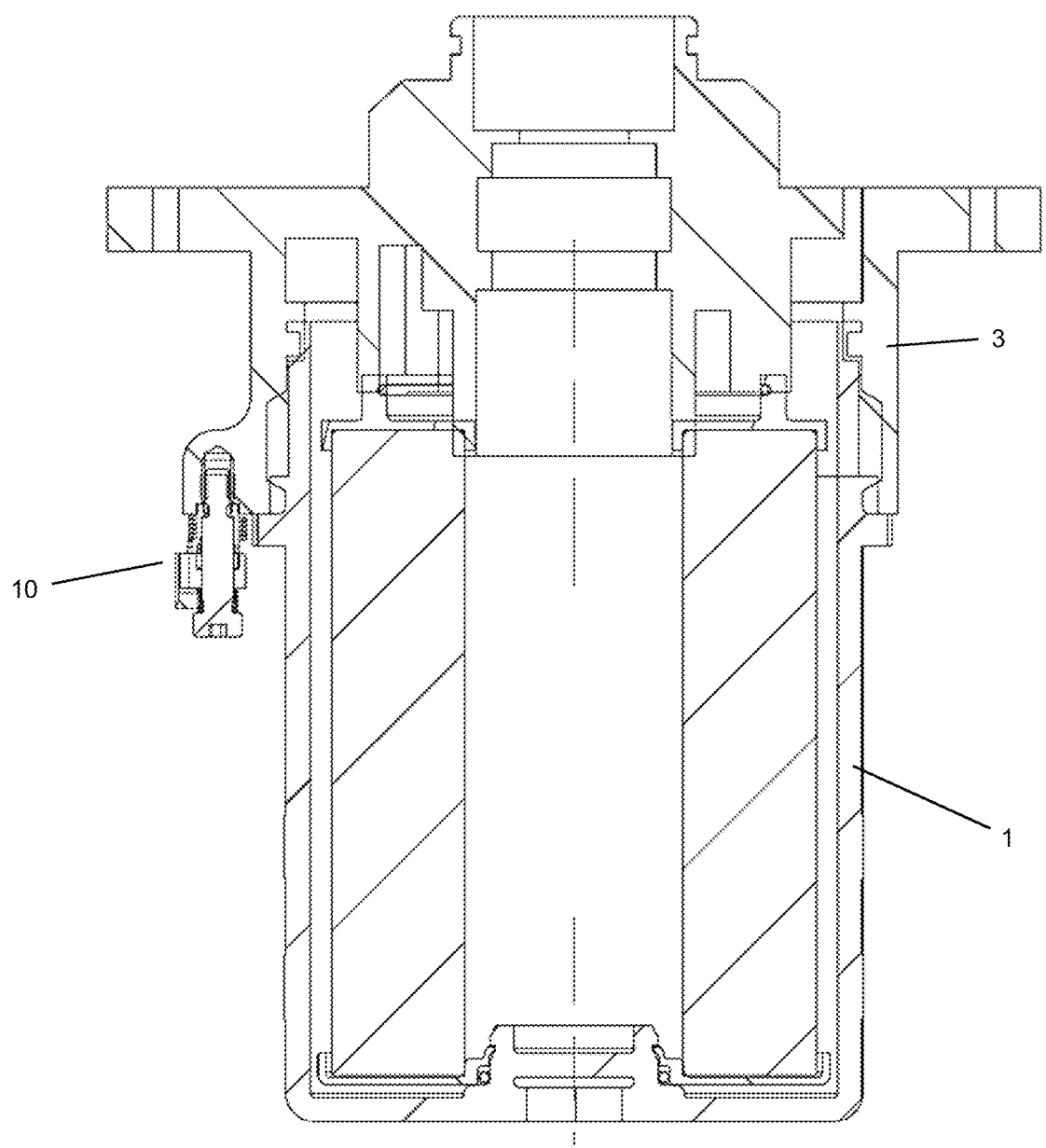

A conventional filter assembly will first be described with reference to FIG. 1. As described above, the assembly usually comprises a filter bowl attached to a manifold 2 via an adapter 3. The bowl engages with the adapter by matching screw threads on the bowl external circumference and the inner circumference of the adapter (not shown here) so that the bowl 1 can be attached to the manifold by engaging the bowl thread to the adapter thread and rotating the bowl relative to the adaptor. The bowl can be removed by rotating in the opposite direction relative to the adapter to unscrew. The manifold 2 may be attached to the adapter 3 by fasteners such as bolts 4. A fluid inlet 5 and a fluid outlet 6 are provided in the manifold and a filter medium (not shown here) is provided inside the bowl 1. Fluid to be filtered enters the inlet 5, flows through channels in the adapter and into the bowl where it flows through the filter medium. The filter medium removes the contaminants from the fluid and filtered fluid is directed out of the assembly e.g. to the engine, via the outlet 6. The flow of fluid through the assembly and the way in which the fluid is filtered is well known and does not form part of the invention covered by this disclosure. This will not be described in further detail. The present disclosure is concerned with improvements to the engagement between the bowl 1 and the adaptor 3 as will be described further below.

As mentioned above, the bowl and the adaptor are usually connected by means of a threaded engagement. In high impact or high vibration environments, or where access to the filter assembly is difficult, the threaded engagement may become loose or not fasten properly leading to an undesirable detachment of the bowl. An additional retaining mechanism 10 is therefore provided to reliably secure the bowl to the adapter.

The retaining mechanism 10 is in the form of a ratchet mechanism shown in detail in FIGS. 4A to 4D and, in use, is mounted to an outer surface of the adapter of the filter assembly. Teeth 20 are provided around an outer circumference of the filter bowl for engagement by the ratchet mechanism.

The retainer mechanism 10 comprises a lever 11 pivotally mounted about an axial screw 12. A torsion spring 13 has an end 13a attached to a first end 11a of the lever 11 and the torsion spring 13 is biased to pivot the lever 11 about the screw axis 12 to a locked position in which the other, second, end 11b of the lever 11 engages with the teeth 20 around the bowl 1 to secure the bowl against rotation relative to the adapter. A compression spring 14 is arranged to bias the lever axially to an axial position where, in the locked position, the second end 11b of the lever engages with the teeth. Thus, the torsion spring causes pivotal movement of the lever relative to the axis and the compression spring 14 controls the axial movement of the lever relative to the axis. In the locked position, the lever is pivoted and is biased to an axial position so that an end 11b engages with the teeth 20 on the bowl.

The first end 11a of the lever is configured to receive pressure from a user, e.g. from a finger or hand of a user, against the force of the torsion spring 13 to thus pivot the lever about the axis so that the second end 11b pivots away from the teeth 20 and thus disengages with the teeth so that the bowl is no longer prevented from rotation relative to the adapter.

The screw 12 is provided with a radially extending shoulder 12a. The compression spring 14 rests between the shoulder and the lever 11 to prevent the compression spring from falling out. A spring retainer 15 is angularly fixed in the adapter 3 and pushed onto the screw 12. A helical self-locking insert 16 is screwed into the adapter 3.

The operation of the retaining mechanism will now be described in more detail with reference to the drawings.

FIGS. 2A to 2E show the assembly when the retaining mechanism 10 is in the engaged position—i.e. in the locked position securing the bowl 1 relative to the adapter 3. The retaining mechanism is attached to the outer surface of the adapter such that the axis on which the torsion spring 13, the lever 11 and the compression spring 14 are assembled extends across the interface between the adapter 3 and the bowl 1 when the bowl is attached by the threaded engagement of the bowl and the adapter as discussed above. The bowl 1 is provided with teeth 20 around the circumference at or just below this interface. The compression spring 14 is configured to bias the lever 11 at an axial position such that the second end 11b of the lever 11, when pivoted under the bias of the torsion spring 13 towards the bowl, engages with the teeth and thus prevents the bowl from rotating relative to the adapter. In this position, the first end 11a of the lever is pivoted away from engagement with the bowl or the teeth. This engagement in the locked position can best be seen in FIGS. 2C and 2D. The bowl 1 is thus secured to the adapter 3 by the conventional threaded engagement and the engagement is prevented from unscrewing by means of the retaining mechanism in the locked position.

Figure 3A:
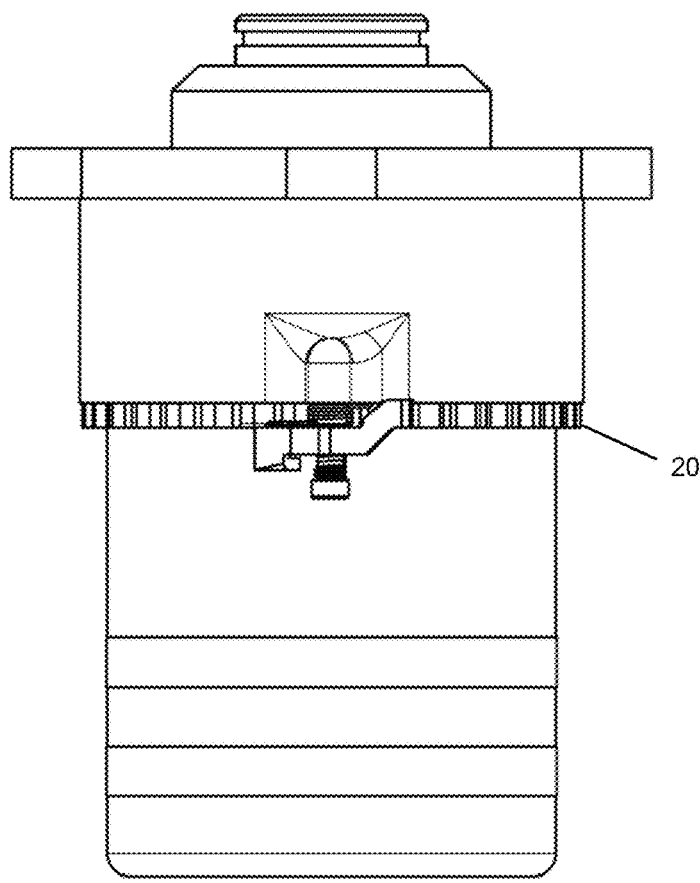
FIGS. 3A to 3D show the mechanism in a disengaged position.
Figure 3B:
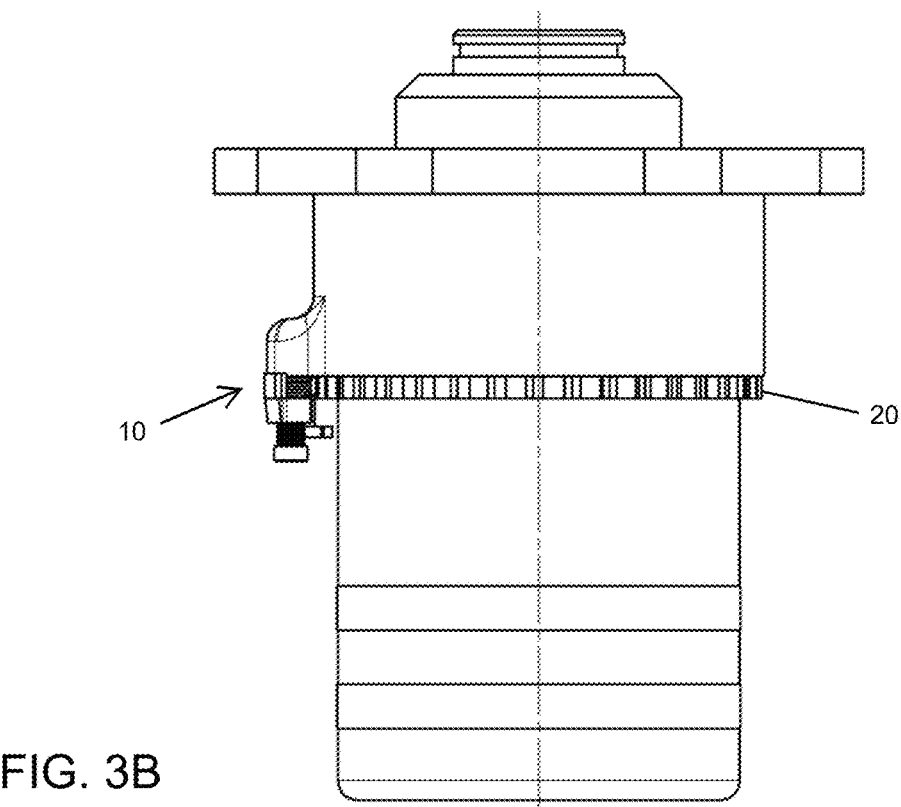
Figure 3C:
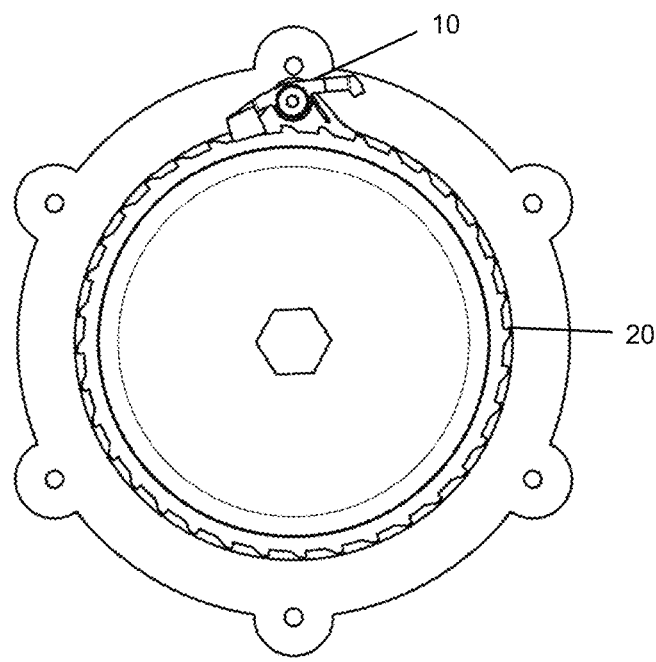
Figure 3D:
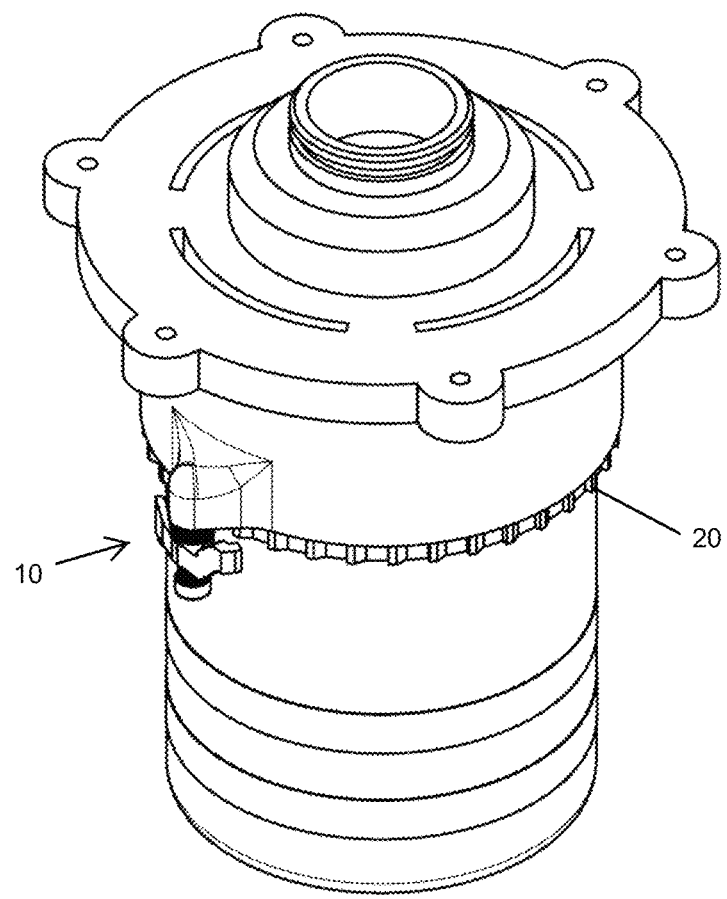
Figure 3E:
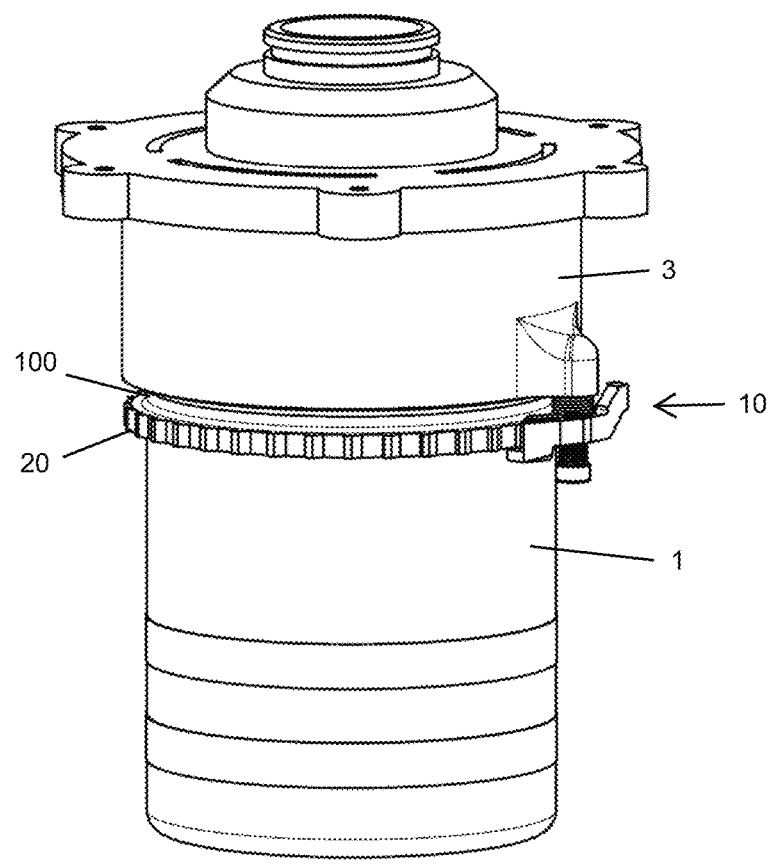
FIGS. 3E and 3F show a mistake-proof feature according to an example of the disclosure.
Figure 3F:
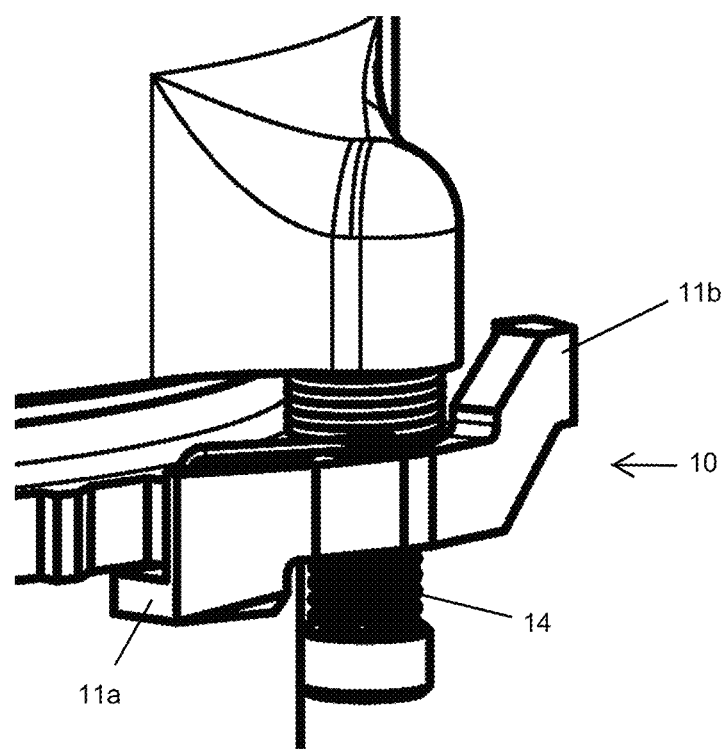
Figure 4A:
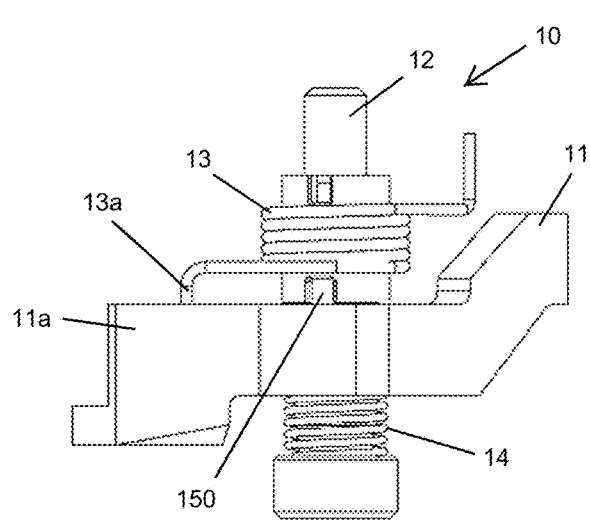
FIGS. 4A to 4E show alternative views of a retainer mechanism according to the disclosure.
Figure 4B:
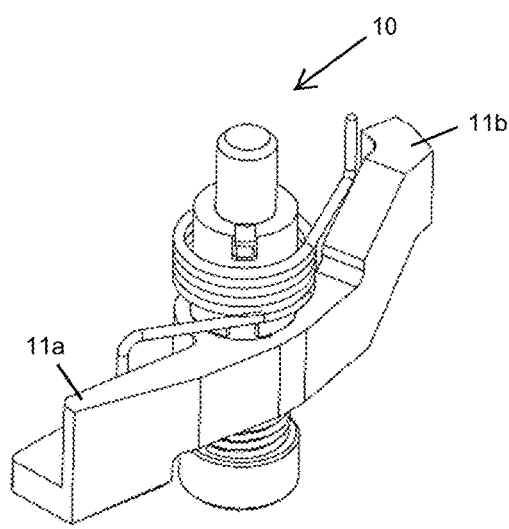
Figure 4C:
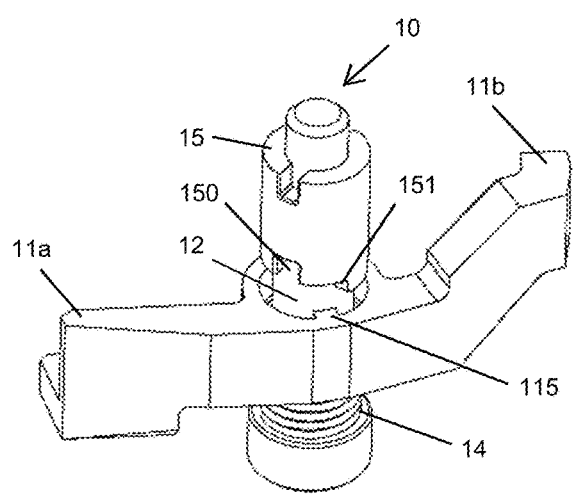
Figure 4D:
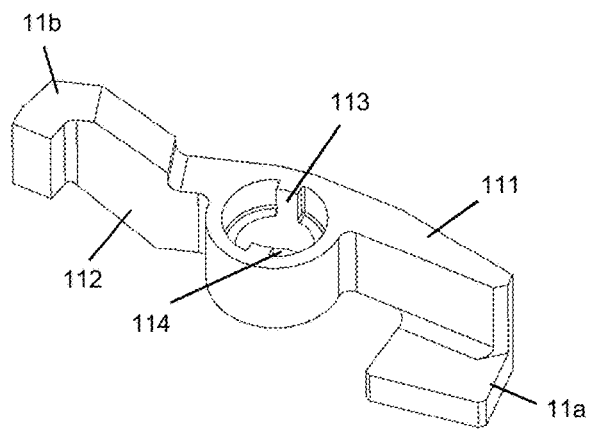
Figure 4E:
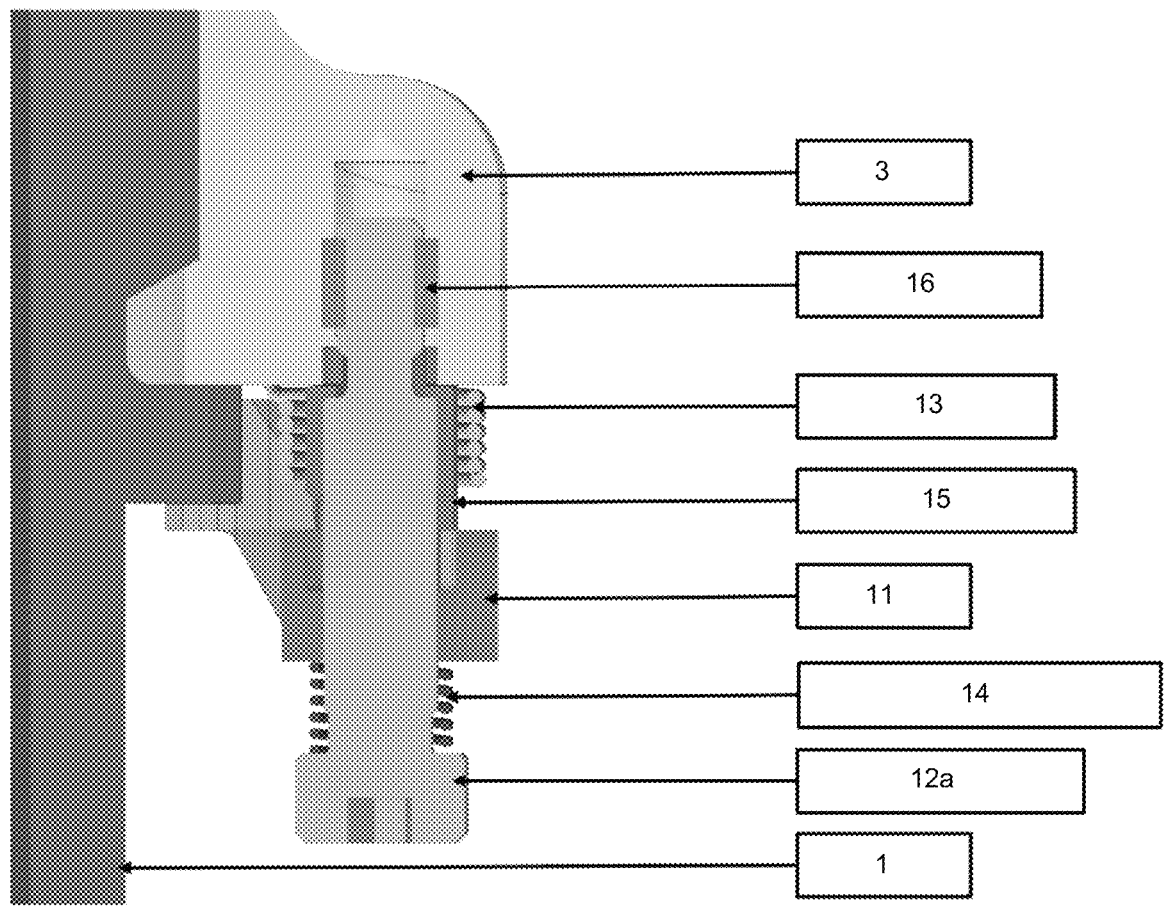

When the bowl 1 is to be removed from the adapter 3, the retaining mechanism needs to be first released from the locked position. To do this, a user applies a pushing force against the first end 11a of the lever 11 e.g. with a finger or a hand, to overcome the force of the torsion spring 13. As the first end of the lever is pushed towards the bowl, the lever 11 therefore pivots about the axis 12 such that the second end 11b pivots out of engagement with the teeth 20, as best seen in FIG. 3D. The bowl 1 can then be rotated relative to the adapter 3, thus unscrewing the threads 100 between the bowl and the adapter to allow the bowl to be removed.

As best shown in FIGS. 4A to 4D, the lever 11 comprises two arms 111, 112 extending either side of a middle part 113 which defines a bore 114 through which the screw 12 passes. A protrusion 115 extends inwardly from the middle part 113 into the bore 114. The spring retainer 15 is arranged between the torsion spring 13 and the screw 12 and is provided with a groove or notch 150. The compression spring 14 pushes against the lever 11 in the axial direction to cause the lever 11 to abut against the spring retainer. In the locked position, the protrusion 115 is out of alignment with the groove 150 and so the lever remains in abutment with the bottom 151 of the spring retainer 15 and the compression spring 14 is compressed as shown e.g. in FIG. 4A.

When the lever 11 is pressed by the user it rotates relative to the screw and also relative to the spring retainer, such that the protrusion rotates relative to the spring retainer. As the protrusion reaches the position where it aligns with the groove 150 the protrusion is able to move into the groove under the force of the compression spring which thus causes the lever 11 to move axially upwards relative to the spring retainer. When the lever 11 is locked in this unlocked position, the user can then use both hands to unscrew the bowl 1 from the adapter 3.

To re-lock the retaining mechanism, the user can pull the lever axially downwards, against the force of the compression spring to release the protrusion from the groove. The torsion spring then acts to force the second end of the lever back into engagement with the teeth 20.

There is, however, a risk that the lever 11 might be actuated accidentally and undesirably moved to the unlocked position.

The mechanism is therefore provided with a mistake-proof function as will be described further below.

With the lever in the unlocked position, the bowl 1 can only be rotated a few turns of the thread before the first end 11a of the lever engages the bottom surface of the teeth 20 as the bowl is rotated but the bowl cannot be fully removed. Therefore, if the lever has been pivoted out of the locked position accidentally, the bowl cannot be fully removed from the adaptor. To intentionally remove the bowl, the user, once the bowl has been rotated a few turns and so the teeth are now axially not aligned with the second end 11b of the lever, returns the lever to the locked position—i.e. pulls the lever down to release the protrusion from the groove and allows the torsion spring to pivot the second end of the lever towards the bowl. Because the bowl has been unscrewed a few turns of the thread, however, the second end of the lever will now not be at the right axial position to engage with the teeth. The lever is then no longer in locking engagement with the bowl and the bowl can be fully unscrewed and detached.

When the filter medium has been replaced or a new bowl is to be attached, the new bowl is pushed into engagement with the retaining mechanism and can be attached to the adaptor by screwing onto the thread. The lever will then be biased by the torsion spring and the compression spring to the locked position.

The invention claimed is:

1. A retention mechanism for releasably securing a filter assembly receptacle to another component of a filter assembly, the retention mechanism comprising:

a ratchet lever pivotally mounted about a screw;
a torsion spring having a first end attached to a first end of the lever and being biased to pivot the lever about the screw axis to a first, locked position, and wherein a second end of the lever engages, in use, with teeth provided on the receptacle to secure the receptacle against rotation relative to the other component; and
a compression spring arranged to bias the lever in an axial position such that, in the first, locked position, the second end of the lever engages the teeth;
wherein the first end of the lever is configured to receive pressure from a user against the force of the torsion spring to pivot the lever about the axis such that the second end of the lever disengages from the teeth and the receptacle is able to rotate relative to the other component.

2. The retention mechanism of claim 1, wherein the lever comprises two arms extending from either side of a middle part, the first arm defining the first end and the second arm defining the second end, the middle part defining a bore through which the screw passes.

3. The retention mechanism of claim 2, further comprising a protrusion extending inwardly from the middle part into the bore and a spring retainer arranged between the torsion spring and the screw and having a groove, whereby, in the first, locked position, the protrusion is out of alignment with the groove such that the lever remains in abutment with the spring retainer and the compression spring is compressed.

4. The retention mechanism of claim 3, configured such that when the lever receives pressure by the user, the protrusion rotates into alignment and engagement with the groove to secure the lever in an unlocked position.

5. A filter assembly comprising:
a filter assembly receptacle; and
another component to which the receptacle is to be releasably attached;
a retention mechanism as claimed in claim 1.

6. The assembly of claim 5, whereby the receptacle and the other component include cooperating threaded engagement features.

7. The assembly of claim 5, wherein the receptacle is a filter bowl and the other component is a manifold adaptor or a manifold.

8. The assembly of claim 7, wherein the filter bowl contains a filter medium.

9. The assembly of claim 8, being a fuel or oil filter assembly.

10. The assembly of claim 5, wherein teeth are provided around an outer circumference of the receptacle and wherein the retention mechanism is attached to an outer surface of the other component.

* * * * *